US008274769B2

(12) United States Patent
Hoffman et al.

(10) Patent No.: US 8,274,769 B2
(45) Date of Patent: Sep. 25, 2012

(54) APPARATUS AND METHOD FOR COOLING POWER TRANSFORMERS

(75) Inventors: Gary R. Hoffman, Randolph, NJ (US); Jeffrey Anderson, Vancouver, WA (US)

(73) Assignee: Advanced Power Technologies, LLC, Randolph, NJ (US)

( * ) Notice: Subject to any disclaimer, the term of this patent is extended or adjusted under 35 U.S.C. 154(b) by 319 days.

(21) Appl. No.: 12/802,412

(22) Filed: Jun. 7, 2010

(65) Prior Publication Data

US 2010/0315188 A1 Dec. 16, 2010

Related U.S. Application Data

(60) Provisional application No. 61/268,773, filed on Jun. 15, 2009, provisional application No. 61/269,204, filed on Jun. 22, 2009.

(51) Int. Cl.
*H02H 7/04* (2006.01)
*H02H 5/06* (2006.01)
*H01F 27/10* (2006.01)
*H01F 27/12* (2006.01)

(52) U.S. Cl. ............................... 361/35; 361/37; 336/57

(58) Field of Classification Search .................... 361/35, 361/37; 336/57
See application file for complete search history.

(56) References Cited

U.S. PATENT DOCUMENTS

| | | | | |
|---|---|---|---|---|
| 4,402,028 | A * | 8/1983 | Udren | 367/36 |
| 4,772,978 | A * | 9/1988 | Oura et al. | 361/36 |
| 5,014,153 | A * | 5/1991 | Wilkerson | 361/36 |
| 6,424,266 | B1 * | 7/2002 | Weekes et al. | 340/588 |
| 6,714,022 | B2 * | 3/2004 | Hoffman | 324/547 |
| 2004/0158428 | A1 * | 8/2004 | Byrd et al. | 702/182 |
| 2009/0147412 | A1 * | 6/2009 | Kojovic et al. | 361/36 |
| 2009/0315657 | A1 * | 12/2009 | Hoffman et al. | 336/57 |

* cited by examiner

*Primary Examiner* — Jared Fureman
*Assistant Examiner* — Scott Bauer
(74) *Attorney, Agent, or Firm* — Henry I. Schanzer

(57) ABSTRACT

The cooling system for a power transformer is activated by sensing and processing the frequency characteristic including the harmonic contents, of the inrush current into the transformer, when the transformer is first energized. The cooling system may include motors operating devices such as oil circulating pumps and fans causing a coolant to flow about the power transformer. The cooling system is deactivated by sensing when the transformer is de-energized and when its temperature is below a predetermined level.

13 Claims, 6 Drawing Sheets

APPARATUS AND METHOD FOR COOLING POWER TRANSFORMERS

This invention claims priority from provisional application Ser. No. 61/268,773 filed Jun. 15, 2009 for Method for Reliably Starting Pumps for Transformer Cooling Control and provisional application Ser. No. 61/269,204 filed Jun. 22, 2009 for Method for Reliably Start Pumps for Transformers With No Self Cooling Rating.

BACKGROUND OF THE INVENTION

This invention relates to the protection of power transformers from excessive heating and, in particular, to controlling the flow of a coolant (e.g., oil) in and about the primary and secondary windings of power transformers.

Power transformers of interest are of the type which, for example, are used in substations and are designed to be part of a high voltage electric power transmission and/or distribution system. These transformers are very expensive and can be easily damaged by excessive heat. It is therefore highly desirable that they be operated so they do not overheat. To this end, large power transformers are generally located within tanks filled with a suitable cooling liquid (e.g., oil) and pumps (e.g., oil pumps) are used to circulate the cooling fluid contained within the transformer's tank.

Certain large power transformers, which may, or may not, be contained within liquid filled tanks need to be cooled as soon as the transformer is energized. These transformers have "no self-cooled" rating. They can not be safely operated without the application of some coolant. Hence, pumps causing a coolant to circulate about these transformers must be started as soon as the transformer is energized. These power transformers with a no self-cooled rating should not be energized unless cooling pumps can be reliably started upon energization of the transformer. With transformers of this design, the failure to start the pumps upon energization can result in overheating and irreversible damage to the transformer.

Note that when a transformer is first energized there may be a momentary inrush of current and various circulating currents in and about the transformer which cause a sudden rise in the temperature of the transformer. Therefore, it is imperative that the cooling fluid be made to circulate simultaneously with the energizing of the transformer to handle heat and temperature conditions due to energization of the transformer.

Prior art methods to handle the problem of turning on the motors driving the cooling pumps and the cooling fans at the right time to circulate the coolant about the transformers include sensing the transformer voltage through: (1) built-in bushing potential devices and/or (2) using a breaker status contact within a circuit breaker used to apply power to the transformer. There are several drawbacks with these prior art methods as noted below.

Known built-in bushing potential devices can detect the application of an operating voltage to a power transformer and in response thereto control a relay to turn-on the pump motors. For example, a prior art method used to activate (turn-on) cooling pumps when power is applied to the transformer (i.e., "energizing" the transformer) includes connecting the output of a Bushing Potential Device (e.g., a KA-108 device sold by General Electric) to a cooling pump motor contactor which provides power to, and turns on, the cooling pump motor. Bushing Potential Devices produce approximately 120 Volts at 60 or 50 Hz when voltage is applied to the transformer. The problem with using Bushing Potential Devices is that they are prone to failure. When they fail, they de-energize the cooling pumps or do not provide the necessary potential to the cooling motors to drive the cooling pumps when power is applied to the transformer. As a result the extremely expensive transformer can be subjected to excessive heat and suffer significant damage.

The breaker status contact (e.g., contact 52A or 52B) indicates that the circuit breaker used to energize the transformer is closed or tripped, whether or not the circuit breaker itself is energized. Using circuit breaker status (e.g., contact 52A) is generally reliable. But such use can cause the pumps to start circulating the cooling fluid before the transformer is energized. Should this happen, starting the pumps prematurely could over-cool the liquid cooling medium. This in turn can lead to degradation of, or damage to, the pump. Over-cooling the liquid cooling medium can also lead to static electrification which in-turn may lead to catastrophic transformer failure. Another problem with this method is that the owners and/or operators of the transformer may test the circuit breakers when the line is not energized. This requires that the operator disable the pump control circuit until testing is complete. If the pump motor and the associated pump are not disabled during testing, the cooling pump will continue to run. This may result in over cooling the insulating fluid, which could lead to mechanical failure of the pump. Thus, known methods of cooling power transformers, particularly the ones with a no-self cooling rating, though generally effective do not always function as reliably as desired.

The problem of supplying cooling by the timely and reliable activation of fans and pumps is not limited to those with a no-self cooling rating. It also applies to many other types of power transformers, such as those whose power handling rating is a function of their temperature under certain power conditions.

Therefore, a need exists to reliably start the motors driving pumps and fans to cause a coolant to flow about a transformer as soon as the transformer is energized and to de-energize the motors and disable the pumps and fans when the transformer is de-energized. In essence, the problem is to turn-on the cooling system for a transformer in a timely and reliable fashion and to turn off the cooling system in a timely and reliable fashion.

SUMMARY OF THE INVENTION

Applicants' invention resides in part in the recognition that the "inrush current" to a transformer (i.e., the current that flows into the transformer when a voltage is first applied to it) has unique frequency characteristics. Applicants' invention further resides in apparatus and methods for sensing selected ones of the unique frequency characteristics of the inrush current and using the sensed signals for effectively, timely and reliably controlling the turn-on of "cooling" systems (e.g., cooling pumps and fans) for cooling the transformer when it is energized.

In accordance with the invention, the current to a transformer, including its inrush current, is sensed and certain frequency characteristics of the inrush current which reliably indicate the energizing of the transformer are used to control the turn-on of the motors driving cooling pumps and fans.

For example, various harmonics (e.g., the $2^{nd}$ harmonic and/or any other harmonic) of the in rush current can be used, separately and/or in combination with each other, to reliably recognize the moment when the transformer is energized, and to then produce signals for controlling the turn-on of cooling motors driving suitable and corresponding cooling devices.

In accordance with an aspect of this invention, cooling motors operating devices used to cool a transformer are: (a)

turned-on by sensing and processing the inrush current into the transformer, when the transformer is energized; and (b) turned-off when the transformer is de-energized (e.g., by sensing a circuit breaker status condition) and operating below a predetermined temperature level.

The proper operation of a power transformer in accordance with the invention may prevent sharp rises in temperature within the transformer and ensure increased reliability of the power system and a savings in repair or replacement cost to the owner or operator of the power transformer.

BRIEF DESCRIPTION OF THE DRAWINGS

In the accompanying drawings, which are not drawn to scale, like reference characters denote like components.

DETAILED DESCRIPTION OF THE INVENTION

The present invention is applicable to any transformer which is intended to be cooled by the application of a circulating coolant (e.g., "forced oil" and/or "force air") when the transformer is energized (i.e., when power is supplied to, and drawn from, the transformer). The invention is particularly applicable to a transformer with no self cooled rating in which case it is essential that the cooling system (e.g., the motors driving the cooling pumps and the cooling fans) be rendered operative the moment an operating voltage/power is applied to the power transformer. As already noted, failure to activate the cooling system can result in a failure of the transformer. However, note that the invention may be used to control the application of cooling to any transformer.

Figure 1:
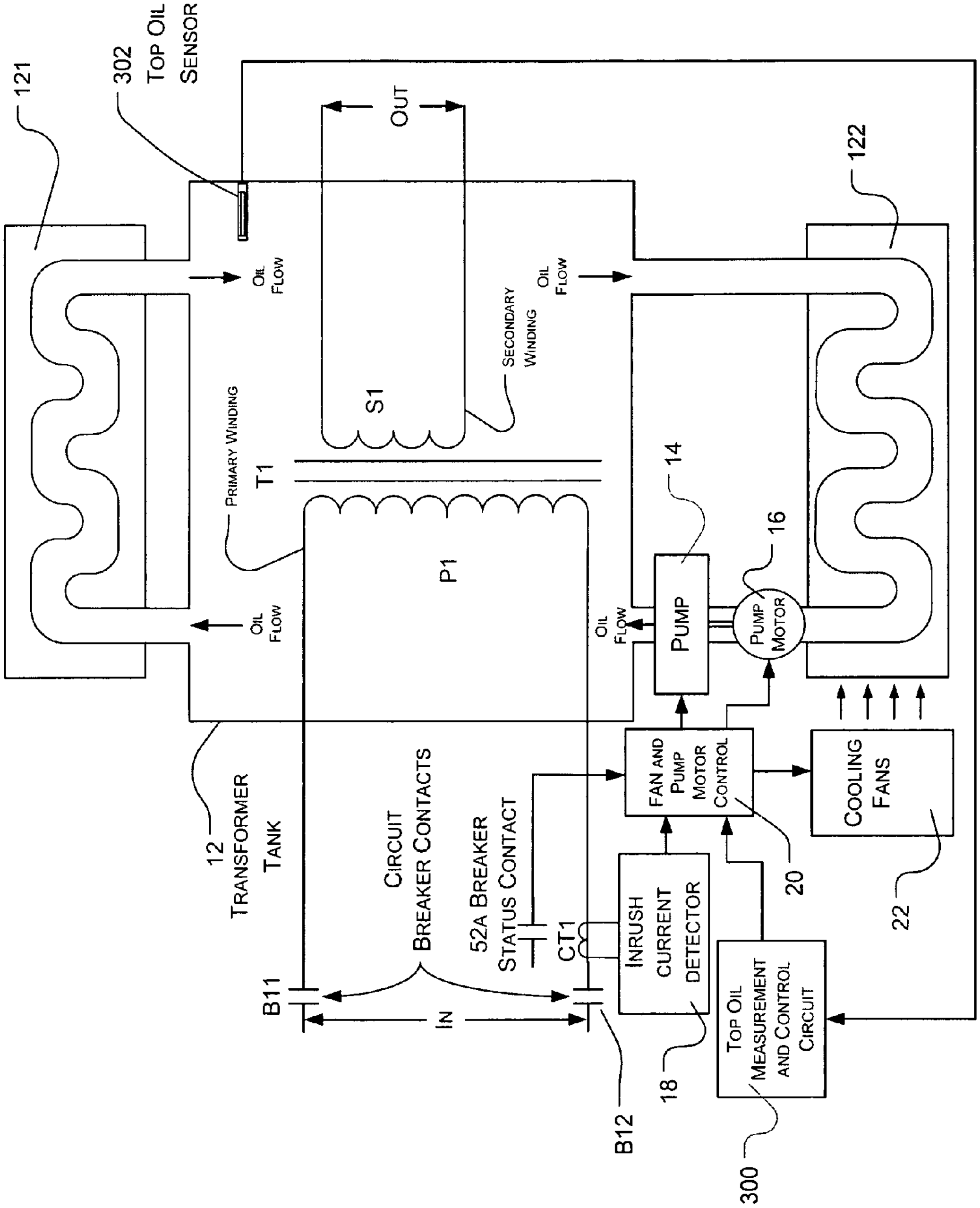
FIG. 1 is a highly simplified illustrative diagram of a transformer and a system for passing a circulating coolant about the primary and secondary windings of the transformer in accordance with the invention.

Description pf FIG. 1

Figure 4A:
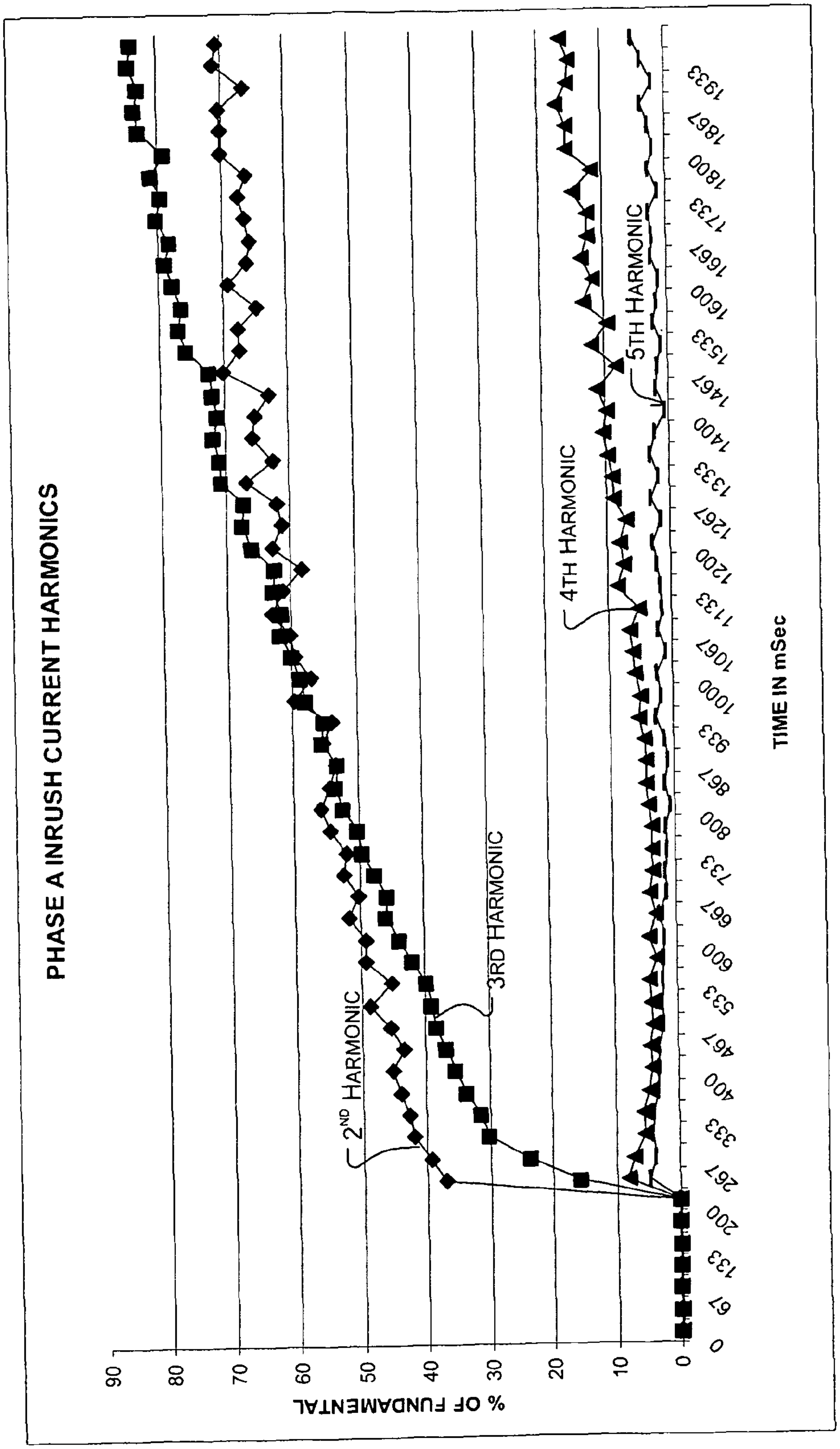
FIGS. 4A, 4B and 4C are illustrative graphs showing representative harmonics present in the inrush current of the three phases of a typical power transformer.
Figure 4B:
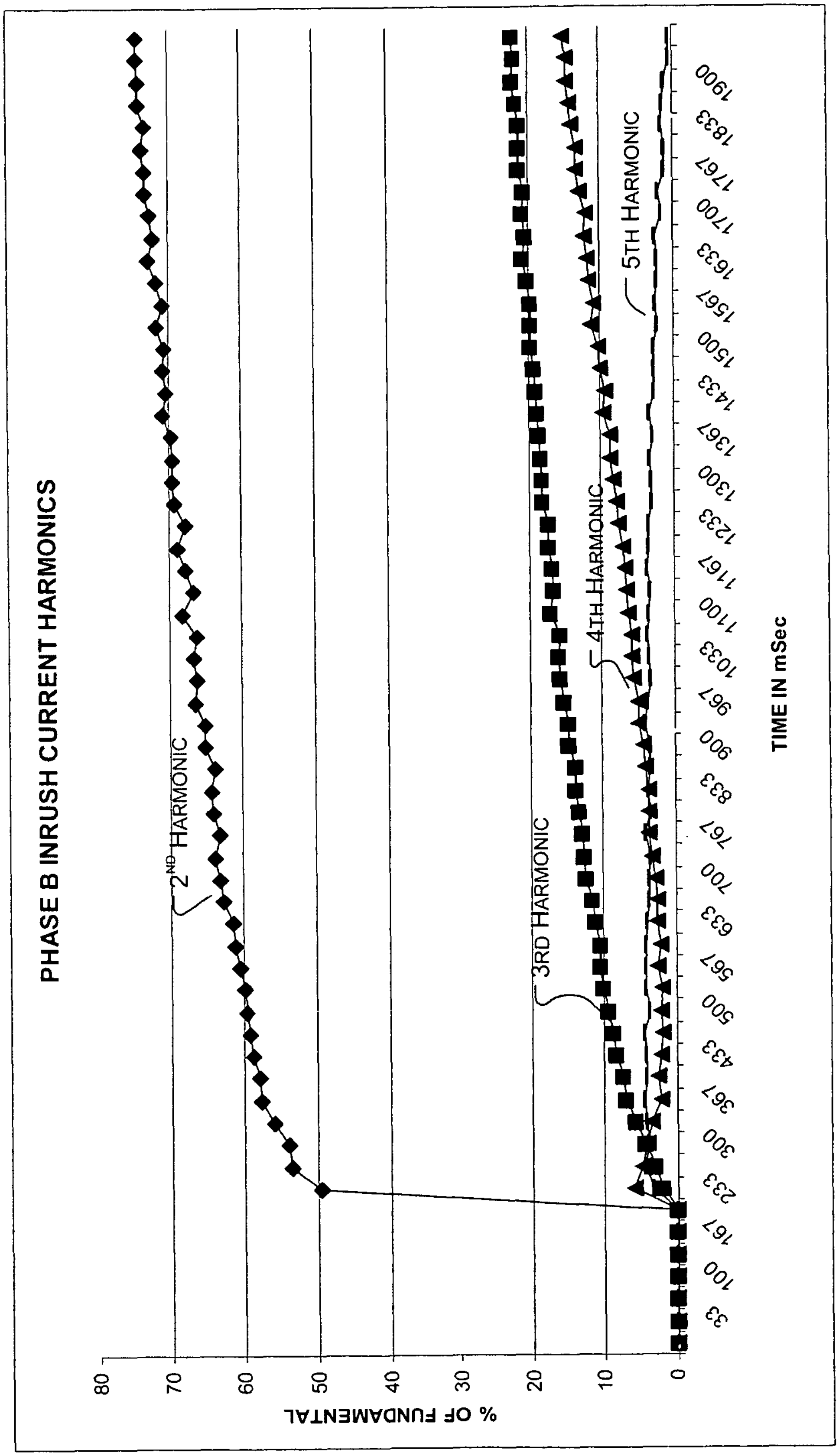
Figure 4C:
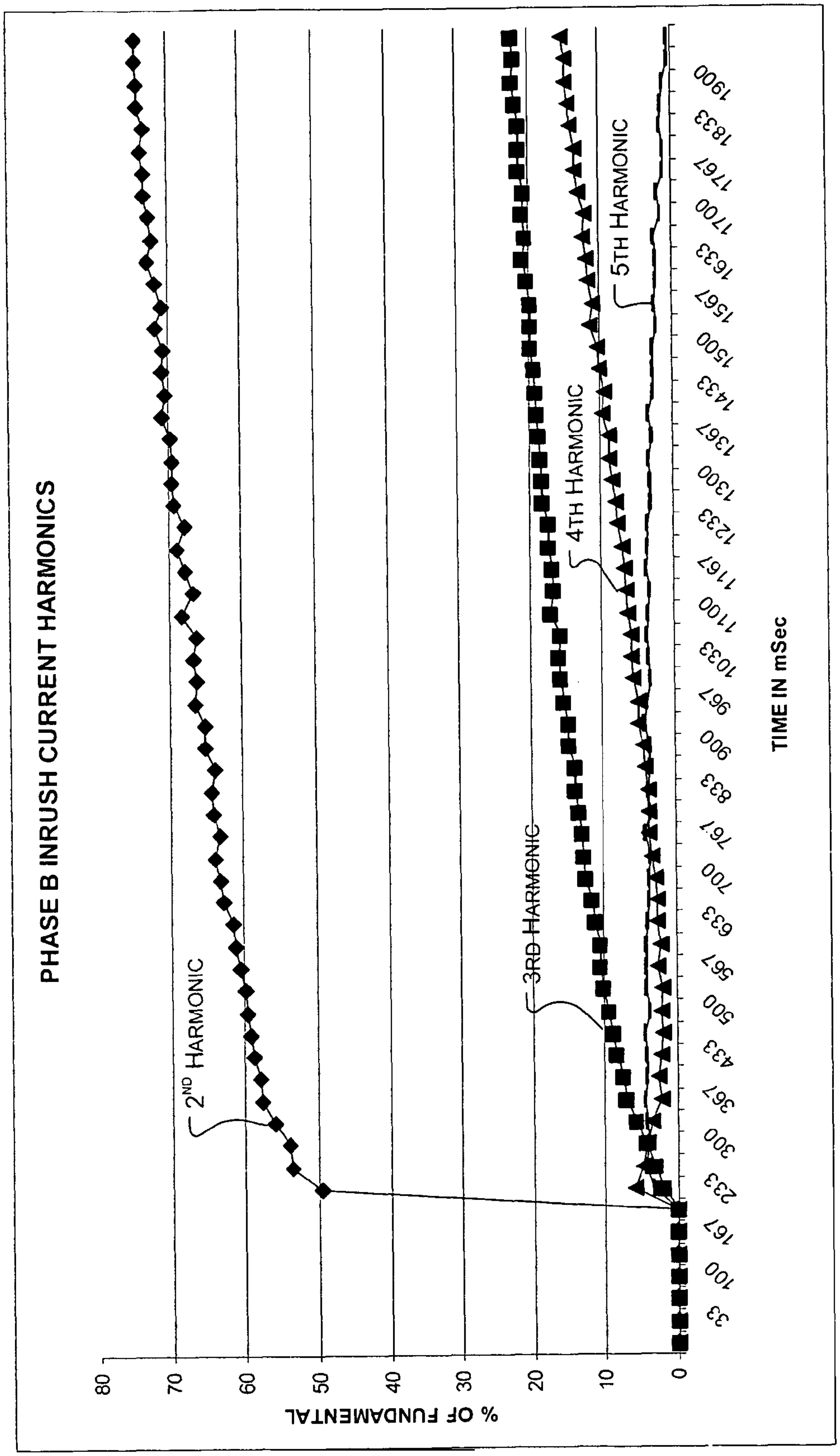

A power transformer T1 is shown located within a tank 12 containing a coolant (e.g., oil). Input power is applied to the primary windings P1 of transformer T1 via circuit breaker contacts B11, B12. The secondary windings S1 of transformer T1 provide an output voltage connected to a load (not shown). The oil within the tank 12 is caused to circulate and flow through radiators 121, 122 under the control of a pump 14 driven by pump motor 16. The radiators may be cooled by cooling fans 22, whose motors are not explicitly shown. The turn-on (energizing) of the motors for the cooling pump and fans is controlled by use of a current transformer CT1 which senses the current flowing in the primary windings P1 of transformer T1. The current flowing through transformer T1 at the moment the transformer is first turned on (when an operating voltage is first applied to the transformer) is referred to as the "inrush" current. The inrush current will have a given amplitude and a frequency characteristic. Although only a single winding is shown in the figures, the transformers in question will normally have 3 phases. As shown in FIGS. 4A, 4B and 4C, the inrush current will also have a measurable amplitude and a distinct number of harmonics. The presence of the distinct frequency characteristics associated with the inrush current is an accurate indication of the application of power to the transformer. Applicants' invention makes use of this phenomenon to control the turn on the cooling system (i.e., the motors which drive the oil circulating cooling pump(s) and the cooling fans).

A current transformer, CT1, senses the inrush current through the power transformer primary P1 and supplies the information pertaining to the inrush current to inrush current detector 18. The detector 18 analyzes the frequency (and amplitude) characteristics of the inrush current and is programmed to reliably determine that power has been applied to the transformer T1. An output of the detector 18 is supplied to fan and pump motor control 20 which can supply: (a) signals to turn on the pump motor 16 and operate the pump 14; and (b) signals to turn on cooling fans 22 which blow cold air on the radiators (122, 121) thereby removing heat. [Note the motors for the cooling fans are not explicitly shown; but they would be energized in tandem with the pump motors]

Inrush current detector 18 is programmed to process the inrush current and to analyze the presence and amplitude of selected harmonics present in the inrush current. If the harmonics exceed a predetermined amplitude, the application of power is deemed detected and the detector 18 produces signals to turn on the cooling pump motor(s) and the cooling fan motor(s). Only one pump motor is shown in FIG. 1, but there could be more than one.

FIGS. 4A, 4B, and 4C show some of the harmonics sensed in the three phases denoted as A, B and C of the primary windings of a 3-phase transformer. In these figures the $2^{nd}$, $3^{rd}$ and $4^{th}$ harmonics are seen to have significant values. It should be appreciated that the $5^{th}$ harmonic and many higher order harmonics, if detectable, can also be used, either directly or after amplification, to practice the invention. Note also that the harmonics can be repeatedly and quickly sampled to enable an analysis of the conditions of the inrush current.

A—Turn on of Cooling Motors:

In accordance with the invention, the cooling system [e.g., the motors driving the oil pump(s) and the cooling fan(s)] is initially turned-on by sensing the frequency characteristics of the inrush current, indicative of the application of power to the transformer. The inrush current may be used to set a condition (via a flip-flop) to maintain power to the cooling system after the current reaches a stable (steady state) condition. Alternatively the cooling system may be kept energized, after the harmonic filled initial transient period, by sensing a breaker contact condition (e.g., 52A contact) indicative of, and responsive to, the application of an operating voltage to the power transformer, T1.

B—Turn off of Cooling Motors:

One mechanism for turning-off (deactivating) the cooling motors driving the pumps and the fans includes using a circuit breaker contact (e.g., 52A circuit breaker status contact) to sense the drop out of power to the primary of T1 and to produce a signal which is used to shut down the pump motor and the cooling fans. Any other suitable sensing of the removal of power may be used instead.

However, note that when power is no longer supplied to (i.e., is removed from) the power transformer, the cooling system is turned off, except if the temperature of the transformer is above a predetermined value. In FIG. 1, the temperature about the transformer T1 is sensed, for example, by a top oil sensor 302. The sensor supplies a signal to a top oil measurement and control circuit 300 which supplies a signal to fan and pump motor control circuit 20. If the sensed temperature is above a given value, the operation of the cooling system is maintained in an operational condition.

Figure 2:
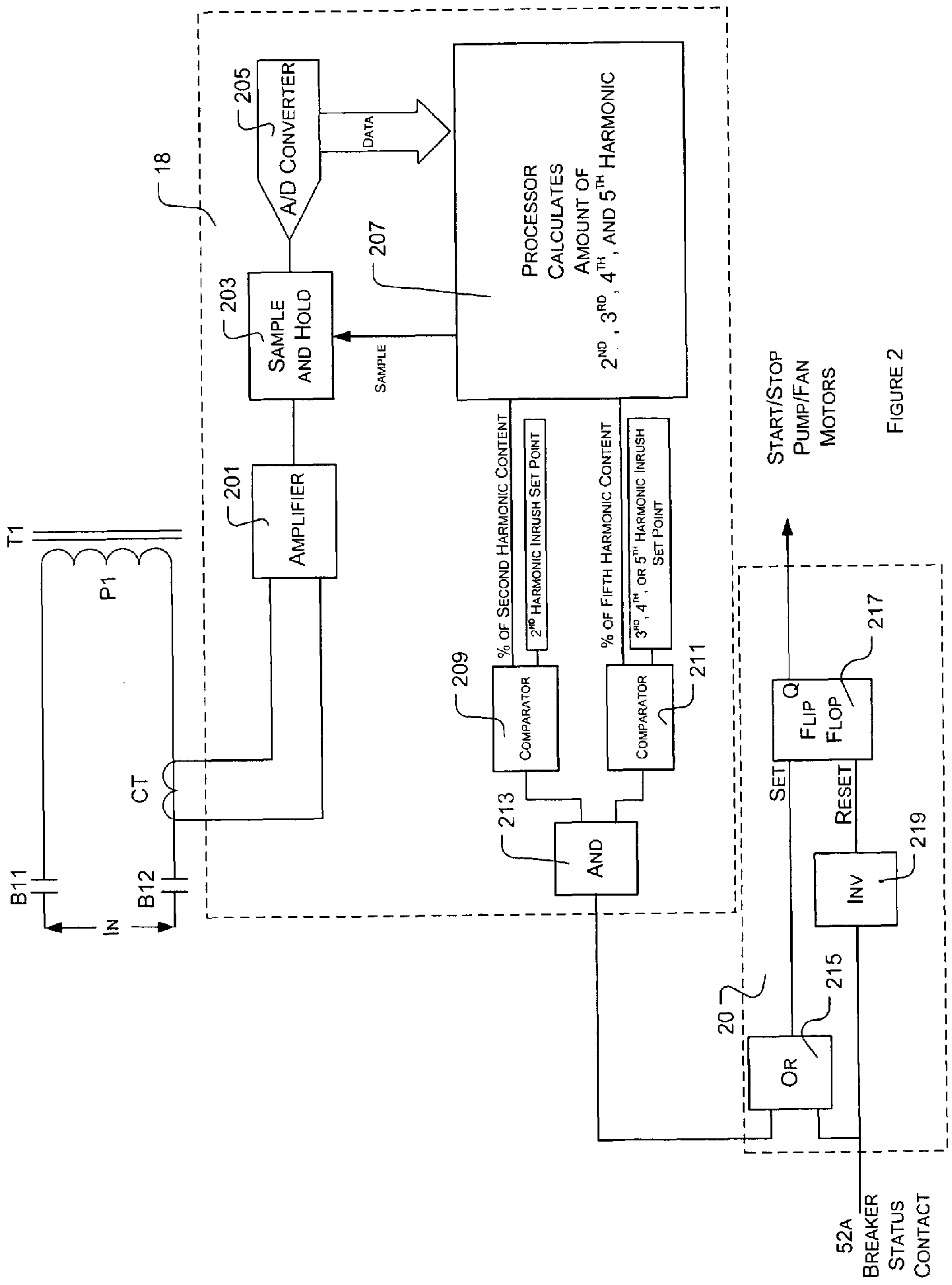
FIG. 2 is a simplified electrical/electronic block diagram of a system for controlling the turn-on and turn-off of cooling pumps and fans in accordance with the invention.

Description of FIG. 2

FIG. 2 is a simplified electrical/electronic block diagram of a system for controlling the turn-on and turn-off of the motors driving the cooling pumps (16,14) and the cooling fans 22. The diagram shows the current transformer CT1 serially connected between breaker contacts B12 and the primary winding P1 of T1 for sensing the current through the transformer primary. The output of CT1 is supplied to an amplifier 201 whose output is then fed to a sample and hold circuit 203 whose contents are sampled by any suitable signal processor 207.

Each time the sample and hold circuit 203 is sampled the output of circuit 203 is applied to an analog to digital converter (ADC) 205 which functions to convert the amplitude of the signal (i.e., the analog value of the signal sensed by CT1) into a digital signal which is applied to a signal processor 207. The processor 207 includes means for sampling the sample and hold circuit 203 at rates which enable the generation of the information necessary to calculate the value of predetermined harmonics. For the embodiment shown, the amounts of the $2^{nd}$ and the $5^{th}$ harmonics in the signal are calculated by the processor 207. The percentage amount of the 2nd harmonic in the sensed current signal is supplied to a comparator 209 which is preset with a predetermined value of the 2nd harmonic indicative of a valid inrush current corresponding to the energizing of the power transformer T1. Similarly, the percentage amount of the $5^{th}$ harmonic in the sensed current signal is supplied to a comparator 211 which is preset with a predetermined value of the $5^{th}$ harmonic indicative of a valid inrush current corresponding to the energizing of the power transformer T1. The outputs of comparators 209 and 211 are fed to a two input AND gate 213 which goes to an enable condition (e.g., "high" level) when the outputs of comparators 209 and 211 indicate that the inrush current through T1 equals or exceeds preset level(s).

In the embodiment of FIG. 2, there is shown the use of the information contained in the $2^{nd}$ and $5^{th}$ harmonic. However, it should be noted that Applicants' invention may be practiced using only one of a number of different harmonics and/or a combination of any two or three (or more) different harmonics. The decision being a function of which signal or combination of signals provides the most reliable and effective resultant signal indicative of the application of power to the transformer.

In FIG. 2, The output of AND gate 213 is fed to one of the two inputs of an OR gate 215. The other input to OR gate 215 is a control signal from the circuit breaker status contact 52A which goes to an enable condition (e.g., "high" level) when power is applied to the transformer. Thus, whenever any of the inputs to OR gate 215 is in an enabling state a positive set signal is applied to flip-flop 217. The output (Q) of flip-flop 217 will then assume a condition (e.g., high) to turn on the "cooling" motors (i.e., the motors operating the cooling pump (s) and the cooling fans). Thus, in response to the inrush current providing an enabling signal and/or the 52A circuit breaker contact providing an enabling signal the flip-flop 217 will be set and the cooling system energized.

In FIG. 2, when the 52A circuit breaker contact indicates that power is no longer applied to the transformer, a reset signal is applied to the reset input of flip-flop 217. In the figure, a 52A circuit breaker contact signal is applied to the input of an inverter 219 whose output is applied to the reset input of flip-flop 217. When that occurs the cooling system is de-energized.

It should be appreciated that logic circuitry to perform the desired function can be implemented in many different ways and may in fact be performed completely within the processor 207 which would be programmed accordingly.

This invention employs different apparatus and method to reliably start the cooling motors and in particular the motor for the cooling oil pump when the transformer is energized. In accordance with the invention, the inrush current is monitored by using the current transformers (CT's). The energization of the transformer is monitored by examining the harmonic content sensed by CT1 indicative of the inrush current associated with the energization of the transformer. When the harmonic content is above a preset value, indicative of the energization of the transformer, the cooling pumps are started (turned-on). This is a very reliable approach because when there is an inrush of current in power transformers, the amount of harmonic content (e.g., $2^{nd}$, $3^{rd}$, $4^{th}$, $5^{th}$) is very predictable.

The use of the frequency characteristics of the inrush current to control the turn on of the cooling motors is very reliable. Thus, using one, or more, of the harmonics generated when power is applied to the transformer and assessing the corresponding amplitude of the harmonics provides a highly accurate, reliable and timely signal for automatically sensing the moment power is applied to the transformer. In the embodiments shown, the means for sensing the inrush current is a current transformer located along the selected windings of the power transformer to sense the inrush current and monitor current flow through the power transformer. Other sensing means could be used. The harmonic content can then be ascertained by sampling the current sensed by the current transformer the moment an operating voltage is applied to the power transformer. Assuming a sampling rate of 2×m×f(t) Hz, which is suitable for examining the $m^{th}$ harmonic of the fundamental frequency f(t) without aliasing, the harmonics of the waveform up to the $m^{th}$ harmonic can be found from the following formula:

$$F_n = 1/m \sum_{k=0}^{m-1} f_k e^{-j2\Pi kn/m}$$

Where: f(t)=fundamental frequency $f_k$=f(kΔt), Δt=1/(m×f(t))

n=the integer harmonic of the fundamental frequency f(t)

m=maximum integer harmonic of the fundamental to be examined k=discrete sample

By way of example, for the fifth harmonic m=5 and at the fundamental frequency of 60 Hz, the minimum sampling rate to avoid aliasing is 600 samples/second.

Figure 3:
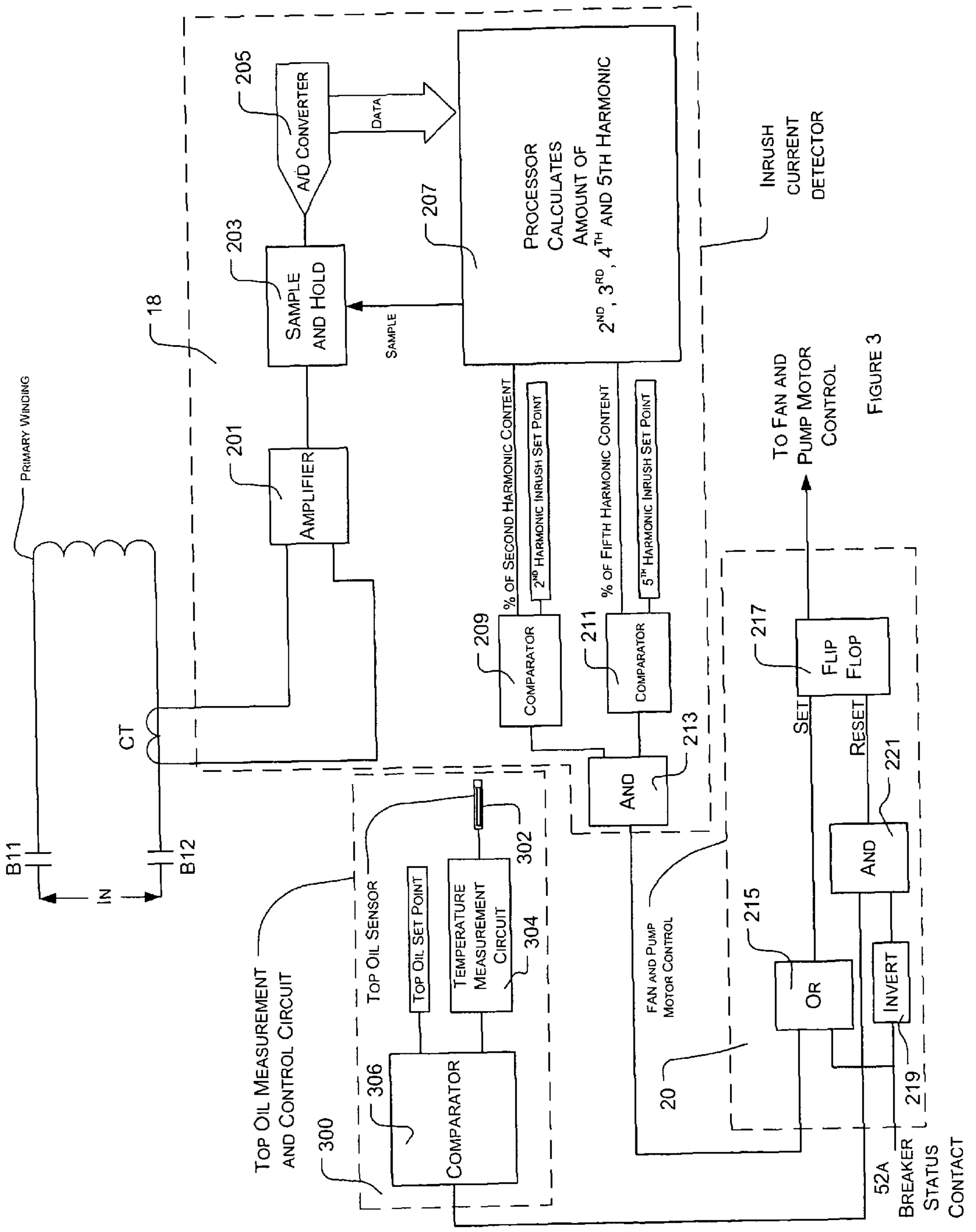
FIG. 3 is a simplified electrical/electronic block diagram of a system of the type shown in FIGS. 1 and 2 with the addition of circuitry for sensing oil temperature within a tank.

When an increase in current is observed and there is sufficient $2^{nd}$ and $5^{th}$ harmonic content present, it can be determined that the transformer has just been energized and the invention will correctly energize the cooling motors for the oil pumps and fans. FIGS. 2 and 3 illustrate embodiments of a method to reliably detect $2^{nd}$ and $5^{th}$ harmonic content to reliably start cooling upon transformer energization.

To correctly de-energize the cooling system, the invention includes monitoring of the 52A breaker status contact on the circuit breaker from which the transformer is energized to determine if the breaker is tripped or closed. Cooling will be terminated if the 52A contact indicates that the circuit breaker has tripped (subject to further control if the temperature of the transformer/oil is above some value as discussed herein). FIG. 2 illustrates a logic system for; (a) turning on the cooling motors in response to the application of an operating voltage to the power transformer; and (b) for turning off the cooling motors when the operating voltage is no longer applied to the power transformer by monitoring a circuit breaker contact (e.g., the 52A contact).

Description of FIG. 3 is a simplified electrical/electronic block diagram of a system for controlling the turn-on and turn-off of the cooling pumps and the cooling fans. The circuit of FIG. 3 is like that of FIG. 2, except that in FIG. 3 there is shown circuitry for sensing the oil temperature within the transformer's tank to ensure that the cooling pump and the cooling fans are not turned-off if the temperature of the oil is above a certain level. Thus, FIG. 3 includes top oil measurement and control circuitry 300 and an additional logic circuit preventing the turn off of the cooling system until a safe temperature is present. Control circuitry 300 includes a top oil sensor 302 coupled to a temperature measuring circuit 304 for sensing the temperature of the oil. The output of circuit 304 is fed to one input of a comparator 306 having another input to which is applied a top oil set point which corresponds to a predetermined temperature level (Temp 1). The output of comparator 306 is applied to one input of two input AND gate 221. The other input to AND gate 221 is the output of an inverter 219 to which is applied a circuit breaker status contact 52A signal. If the circuit breaker signal indicates that the operating potential has been removed from the power transformer but if the sensed temperature is above Temp 1, no reset signal is applied to flip-flop 217 and the cooling pumps and fans remain turned-on (even if the transformer T1 is de-energized). If the circuit breaker signal indicates that the operating potential has been removed form the power transformer and if the sensed temperature is below Temp 1, then a reset signal is applied to lip-flop 217 and the cooling pumps and fans are turned-off.

The invention has been illustrated for a power transformer having no self cooled rating which is immersed in a tank filled with oil. Oil is very desirable coolant since it is an electric insulator and also functions as a good cooling medium. However other coolants (e.g., water and liquid nitrogen) can also be used. Also, it is possible that the transformer may be free standing and forced air may then be blown directly onto the transformer to cool it. In which case, the description above pertaining to the pump motors would be equally applicable to the fan motor.

The rating of a transformer is different for different types and levels of cooling. Accordingly, the invention applies equally, for example, to power transformer which are cooled using forced-oil and forced air (OFAF) and oil forced directed-flow-forced air (ODAF). It should be evident that the invention may be used with any type of power transformer to which it is desired to apply cooling the moment an operating voltage is applied to it, regardless of the transformer rating.

In the discussion above, the current transformer for sensing the inrush current is placed in the primary circuit (power input side) of the power transformer. It should be understood that there are applications where it is desirable to have the inrush current sensed in the secondary circuit of the power transformer. This is often the case where the power transformer is a step-up transformer. The inrush current is then measured on the "higher" voltage side. Therefore, the invention is equally applicable to systems where the inrush current in the secondary of the power transformer is sensed to control the turn-on of the cooling system.

What is claimed is:

1. Apparatus for protecting a power transformer having a primary winding to which an operating voltage is selectively applied and having a secondary winding intended to be coupled to a load and wherein the power transformer is cooled by a coolant which is caused to flow about the transformer via at least one cooling device coupled to a motor, the protective apparatus comprising:

means for sensing the application of an operating voltage to the power transformer including means for sensing an inrush current when the operating voltage is applied to the power transformer, said inrush current displaying frequency characteristics;

means for processing the sensed inrush current and determining the presence and value of selected frequency characteristics of the inrush current; and means responsive to the frequency characteristics of the inrush current having a certain value indicative of the application of an operating voltage to the power transformer for turning-on the motor and causing the coolant to flow about the transformer.

2. Apparatus as claimed in claim 1, wherein the means for processing the inrush current and determining the presence and value of selected frequency characteristics of the inrush current includes means for determining the presence of selected harmonics of the frequency characteristics.

3. Apparatus as claimed in claim 1 further including means responsive to the removal of the operating voltage to the transformer and to the temperature of the transformer for turning off the motor when the operating voltage is removed from the transformer and the temperature of the transformer is below a predetermined value.

4. Apparatus as claimed in claim 1 wherein the transformer is located in a tank and is immersed in a cooling liquid and wherein the motor drives a pump which causes the liquid to flow about the transformer.

5. Apparatus as claimed in claim 4 further including at least one cooling fan which is driven by a cooling fan motor which is turned-on concurrently with the turn-on of the pump motor.

6. Apparatus as claimed in claim 4, further including means for sensing the temperature of the cooling liquid and wherein the pump motor is kept turned on and operational after the removal of the operating voltage to the transformer so long as the temperature of the cooling liquid exceeds a pre-selected value.

7. Apparatus as claimed in claim 1 further including means responsive to the removal of the operating voltage to the power transformer for turning off the motor when the operating voltage is removed from the power transformer.

8. Apparatus as claimed in claim 1 wherein said means for sensing an inrush current in includes means coupled to the primary winding of the power transformer.

9. Apparatus as claimed in claim 1 wherein said means for sensing the application of an operating voltage to the power transformer including means for sensing an inrush current includes a current transformer located along a selected portion of the transformer winding; and wherein said means for processing the sensed inrush current and determining the presence and value of selected frequency characteristics of the inrush current includes a sample and hold circuit, an analog to digital converter and data processing circuitry for determining the harmonic content of selected parts of the inrush current.

10. Apparatus as claimed in claim 1 wherein said means for processing the inrush current having a fundamental frequency and harmonics includes a signal sampling circuit and an analog-to-digital converter for sampling the amplitudes of the inrush current at elevated and converting them to digital signals and a signal processor circuit for processing and determining the values of the harmonics generated by the inrush current.

11. Apparatus as claimed in claim 10 wherein the means responsive to the frequency characteristics of the inrush current having a certain value indicative of the application of an operating voltage to the power transformer include means for turning-on the motor and causing the coolant to flow about the transformer when the values of selected harmonics exceed some predetermined value.

12. A method for protecting a power transformer having a primary winding to which an operating voltage is selectively applied and having a secondary winding intended to be coupled to a load and wherein the power transformer is cooled by a coolant which is caused to flow about power the transformer via at least one controllable cooling device, the method comprising the steps of:

sensing the inrush current in the power transformer at the moment when an operating voltage is first applied to the power transformer;

processing the inrush current to determine the presence of selected harmonics;

detecting the presence of selected harmonics having a predetermined value; and causing the coolant to flow about the power transformer when the value of selected harmonics exceed a predetermined value.

13. Apparatus for protecting a power transformer having a primary winding to which power is selectively applied and having a secondary winding intended to be coupled to a load and wherein the power transformer is cooled by a coolant which is caused to flow about the transformer, the protective apparatus comprising:

means for sensing the application of power to the primary winding of the transformer including means for sensing the flow of current through the transformer when power is applied, which current is defined as the inrush current and said inrush current having a frequency characteristic;

means for processing the frequency characteristic of the inrush current and determining the presence and value of significant characteristics of the inrush current; and means responsive to the frequency characteristic of the inrush current having a certain value for causing the coolant to flow about the transformer.

* * * * *